Oct. 27, 1970     J. F. BATES     3,536,459
STAINLESS STEEL COMPOSITE
Filed Nov. 29, 1967
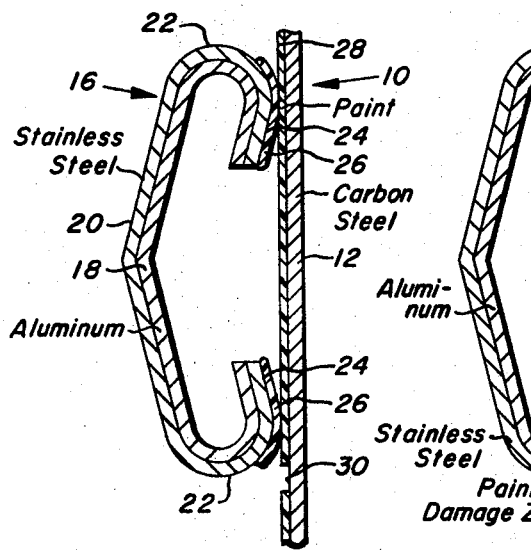
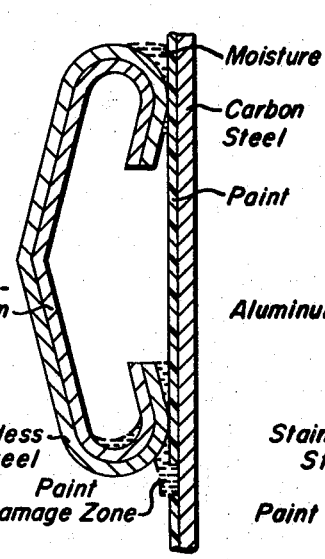
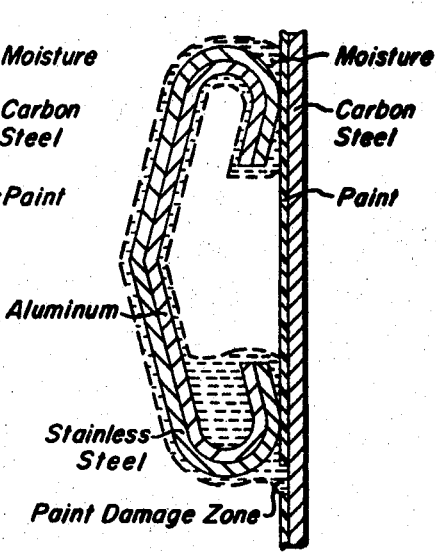
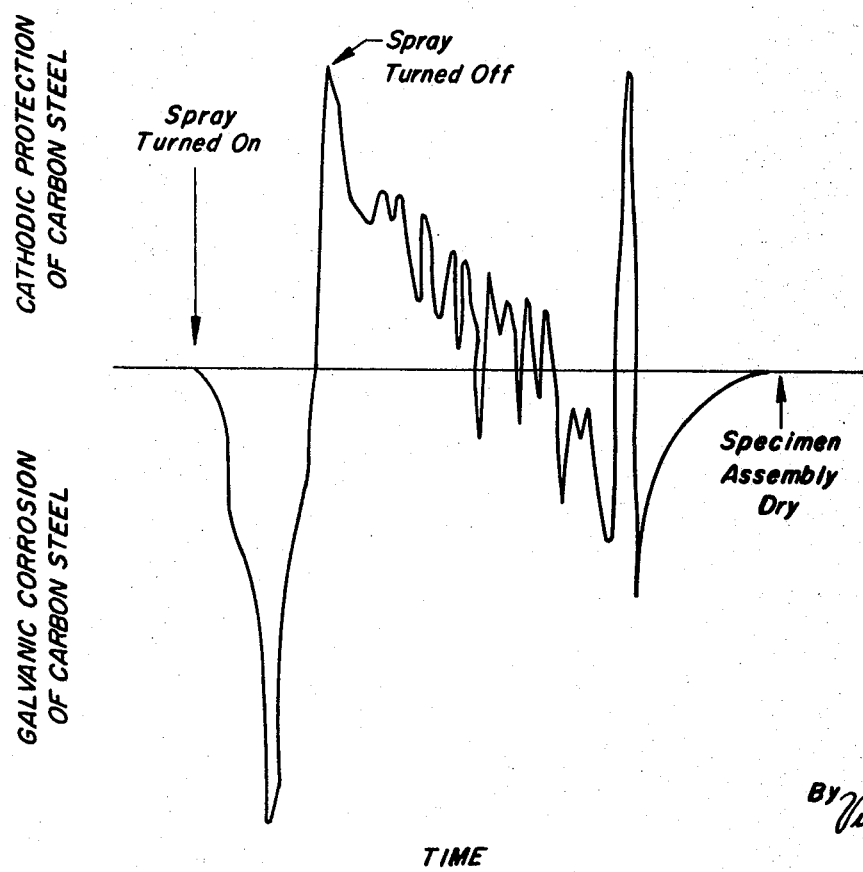
INVENTOR
JOHN F. BATES
BY *Vincent D. Gioia*
Attorney United States Patent Office 3,536,459
Patented Oct. 27, 1970

3,536,459
STAINLESS STEEL COMPOSITE
John F. Bates, Franklin Township, Westmoreland County, Pa., assignor to United States Steel Corporation, a corporation of Delaware
Filed Nov. 29, 1967, Ser. No. 686,634
Int. Cl. B32b 15/04; B60r 13/04
U.S. Cl. 29—191.6                                    6 Claims

ABSTRACT OF THE DISCLOSURE

Stainless steel automotive trim having a reverse bend on the edges thereof to provide faying surfaces, the surface inside the reverse bends being coated with a sacrificial metal electrochemically more active than carbon steel and a coating of an electrically nonconductive material on the stainless steel faying edges.

---

This invention relates to preventing galvanic corrosion of carbon-steel bodies in contact with stainless steel articles. More particularly, the invention involves a novel stainless steel composite for use in applications involving contact with carbon-steel bodies.

The corrosion resistance and outstanding appearance of stainless steel is well recognized and stainless steel has been used in many applications where both resistance to corrosion and appearance are important factors. In particular, stainless steel articles have been used extensively for exterior automotive trim. Many stainless steels have excellent formability and resistance to corrosion, abrasion and denting, and are quite suitable for automotive applications. About the only significant disadvantage of stainless steel trim on automotive bodies is that the paint on the carbon steel auto body adjacent to the stainless steel exterior trim may become rust stained by the galvanic corrosion of the carbon steel. The rusting originates at damage points or pinholes in the paint on the body and is increased by galvanic coupling of the carbon steel with the stainless steel trim in the presence of corrosive fluids such as solutions of salts used for road de-icing which act as electrolytes. The corrosive effect may result in a light staining, which is only unsightly on light colored cars, and even in blistering and paint degradation, which of course is more serious.

As is well known, galvanic corrosion will occur when dissimilar metals are in electrical contact in the presence of an electrolyte. It has been recently proposed to apply an anodic or sacrificial coating onto one side of the stainless steel auto trim to minimize corrosion of the carbon steel auto body with which the stainless steel trim is in contact. Typically, zinc or aluminum coatings have been applied to stainless steel for this purpose. Aluminum has been applied both as a thin vapor deposited coating on stainless steel and as a thicker sheet laminate adhesively bonded to the stainless steel.

The present invention involves the discovery that composites of sacrificial metal and stainless steel can be further improved to minimize corrosion of carbon steel with which they are in contact. Such an improved stainless steel composite in accordance with the invention for use in areas of contact with carbon steel bodies subject to exposure to corrosive fluids comprises a central core of stainless steel, an interior sacrificial metal coating, i.e. a coating of a metal electrochemically more active than carbon steel, and an outer coating of an electrically nonconductive material. Thus, in accordance with the invention, corrosion of a carbon steel body in contact with a stainless steel composite of the type described is minimized.

The invention will be more fully described by reference to the accompanying drawings in which:

FIG. 1 is a schematic cross-sectional view of a stainless steel composite in accordance with the invention in a typical application in contact with a carbon steel article such as an auto body;

FIGS. 2a and 2b are schematic cross-sectional views of conventional stainless steel composites exposed to a corrosive solution at different stages of drying; and FIG. 3 is a graphical illustration of the galvanic effects of wetting stainless steel having a sacrificial metal coating of aluminum on one surface thereof with a corrosive solution of sodium chloride.

Since a major application of the invention is with respect to stainless steel automotive trim on the carbon-steel auto body, the following discussion and ensuing examples of simulated tests will be described in this context.

As is shown in FIG. 1, the assembly 10 includes a simulated carbon steel body 12 and a stainless steel composite 16. The composite 16 includes an interior coating 18 of a sacrificial metal on a stainless steel exterior 20. In a normal auto trim application, the stainless steel molding is manufactured with reverse bend sections 22 as shown in FIG. 1. The surface 24 of the stainless steel reverse bend section 22 is known as the "faying" surface, and this term will be hereinafter used in this connection. Thus, the stainless steel composite shown in FIG. 1, in accordance with the invention, includes a coating of electrically nonconductive material 26 at the faying surface. It will be observed that the electrically nonconductive material is interposed at the faying surface between the stainless steel "core" and the carbon steel body adjacent thereto.

While the carbon steel may typically possess a surface paint 28 as shown, the present invention has as its object the protection of the carbon steel in the virtually inevitable presence of a defect in the protective paint layer on the carbon steel. A simulated defect exposing the carbon steel is shown at 30 as a discontinuity in the paint. It is obvious that such discontinuities may occur during the paint application as pinholes or by mechanical injury resulting from chipping, scraping, etc. of paint from the carbon steel in the vicinity of the stainless steel trim.

Corrosion of the carbon steel results when corrosive fluid forms a galvanic coupling between the stainless steel trim and the carbon steel body under conditions in which the sacrificial aluminum coating is not operative to provide protection to the carbon steel body. This condition is illustrated in FIG. 2a which shows the manner in which the carbon steel body is attacked by corrosion in an assembly of the type illustrated in FIG. 1. The condition illustrated in FIG. 2b is the condition under which the sacrificial coating serves to protect the carbon steel body from corrosive attack. In FIGS. 2a and 2b, the carbon steel body has a painted surface with a paint-damage zone adjacent the stainless steel trim represented by a discontinuity in the paint. As corrosive fluids such as salt solutions collect in the crevices, they form a galvanic coupling between the stainless steel trim and the carbon steel body, and corrosion of the carbon steel results. On the other hand, when the entire assembly is wet as shown in FIG. 2b, the sacrificial metal on the stainless steel trim is galvanically connected through the solution, which acts as an electrolyte, with the carbon steel and affords cathodic protection thereto. When the assembly is partially wet or nearly dry (as in FIG. 2a), there are times when the sacrificial metal is dry and only the stainless steel at the faying or contacting surface is connected through the electrolyte with the carbon steel body.

At such times, the carbon steel undergoes galvanic corrosion. Of course, when the entire assembly is dry, no galvanic corrosion occurs.

The curve shown in FIG. 3 illustrates the galvanic coupling affect described above. This curve is the result of a test conducted on a piece of laminated stainless steel molding fastened to an epoxy block containing carbon steel wire as a simulated paint damage zone. The carbon steel and the stainless steel trim were connected through a galvanometer to record the corrosion current flowing therebetween. The trim assembly was sprayed lightly with a thin spray of kaolin in a 3% NaCl solution until the assembly was thoroughly wet. The corrosion current was recorded from the time the spray was turned on until the assembly was dry and all current ceased. The curve shown in FIG. 3 represents the pattern of current flow. Thus, as seen in the figure, before the assembly was entirely wet the carbon steel underwent galvanic corrosion. When the assembly was totally wet, the carbon steel was cathodically protected by the sacrificial metal coating on the stainless steel. As the assembly dried, the current changed erratically from cathodic production to galvanic corrosion of the carbon steel. It is seen, therefore, that in such applications a mere composite of stainless steel and sacrificial metal is only partly protective of the carbon steel because it is effective only part of the time.

It is apparent from the above that since stainless steel trim on carbon steel auto bodies is subject to alternate wetting and drying, and because of the current reversals described above, corrosion of the carbon steel body may occur. However, it has been discovered that if a layer of electrically nonconductive material is interposed between the stainless steel core and the carbon steel body, potentially corrosive conditions may be materially minimized. The effectiveness of a composite in accordance with the invention in reducing the corrosion of a carbon steel body is clearly evident from the ensuing examples. In these examples, strips of stainless steel such as Types 301, 434 and 436 were made and provided with both 0.06 mil aluminum coating by vapor deposition on one surface thereof and 10 mil aluminum laminates adhesively bonded thereto. Electrically nonconductive material was applied to some of the specimens at the faying surface. In the examples, wax and vinyl paints were used as the electrically nonconducting material. The specimens with vinyl paint were made by brushing on two coats of paint and baking at 300° F. for 5 minutes. The wax was applied to the stainless steel surface by dipping the trim into hot liquid wax which was subsequently solidified by chilling. The specimens were exposed on a special test trailer using Plexiglas mounting boards to which individual panels were attached and mounted on a trailer frame with the specimens facing down parallel to the road surface. After extensive exposure of the test materials to corrosive fluids, i.e. solutions of sodium chloride, calcium chloride, etc., the specimens were disassembled, washed, dried and then evaluated for rust staining on adjacent paint surfaces. The stained areas were rated from 0 to 6 by comparison with standard specimens. The results of these tests of stainless steel composites are described in Table I. The average rust staining ratings are on a scale of 0 for the best to 6 for the poorest. Rust staining averages of less than 0.6 exceed the average rust staining of carbon steel without trim.

TABLE I

| FSC=vinyl paint: | Average rust-staining rating |
|---|---|
| Stainless/Al (adhesively bonded), FSC | 0.1 |
| Stainless/Al (vapor coated), FSC | 0.3 |
| No trim | 0.6 |
| Stainless/Al (vapor coated) | 0.8 |
| Stainless Steel, FSC | 0.9 |
| Stainless/Al (adhesively bonded) | 1.2 |
| Stainless steel | 2.5 |

| FSC=wax: | Average rust-staining rating |
|---|---|
| Stainless/Al (vapor coated), FSC | 0.4 |
| Stainless/Al (adhesively bonded), FSC | 0.6 |
| Stainless/Al (vapor coated) | 1.5 |
| Stainless/Al (adhesively bonded) | 1.8 |
| Stainless steel | 2.6 |

As is seen from the data in Table I above, the faying surface paint on the stainless steel aluminum adhesive laminate and on the stainless steel trim with vapor deposited aluminum entirely prevented galvanic corrosion of the carbon steel body.

A similar result is observed with the specimens coated with wax and it is evident that a significant beneficial result was obtained on the specimens having electrically nonconductive material applied to the faying surface of the stainless steel composite. Although the wax and paint are equally beneficial, other insulating coatings would perform as well. In some cases, the wax application has some advantages over paint since it may be applied in a single coat process with no curing necessary, and it is a soft coating that may reduce damage to the auto body paint during automobile assembly. Moreover, it can be applied as a thick enough layer to form a caulk which would further reduce the amount of corrosive contaminants that may get behind the molding.

A most significant fact evident from the data of Table I is that the application of a coating of electrically nonconducting material to the stainless steel is not as effective as the application of the electrically nonconducting material to a stainless steel composite having a sacrificial coating metal. Similarly, the composite of stainless steel and sacrificial coating metal without the electrically nonconducting coating is also not as effective in preventing rust staining as the composite with such a coating.

It is apparent from the above that various changes may be made without departing from the invention. Thus, the sacrificial metal portion of the composite may include any metal electrochemically more active than carbon steel and specifically aluminum, zinc or magnesium. Similarly, the coating on the faying surfaces may comprise any electrically nonconducting material and may be organic or inorganic. Adhesion to the faying surface of the stainless steel and the general continuity of the coating over the entire faying surface is very important, however, since voids in the faying surface coating will increase the time of solution contact between the stainless steel and the carbon steel. Occasional pinholes in the faying surface coating will not be harmful.

I claim:

1. In a stainless steel article for use in contact with carbon steel wherein the edges of the stainless steel are reverse bent to provide faying surfaces and the stainless steel surface inside the faying edges is coated with a sacrificial metal electrochemically more active than carbon steel, the improvement comprising a coating of electrically nonconductive material along the outer stainless steel faying edge to be interposed between the stainless steel and the carbon steel.

2. A stainless steel composite in accordance with claim 1 wherein said electrically nonconducting material is a substance from the group consisting of paint and wax.

3. A stainless steel composite in accordance with claim 1 wherein said metal electrochemically more active than said carbon steel is aluminum.

4. A molded stainless steel article adaptable to be fastened to a carbon steel auto body and having reverse bend end sections with faying surfaces which contact said auto body, which comprises a coating of a metal more electrochemically active than carbon steel on the interior surface of said stainless steel and a coating of electrically nonconducting material on said faying surfaces of said stainless steel molding.

5. A stainless steel article in accordance with claim 4 wherein the faying surface coating is a material from the group consisting of paint and wax.

6. A stainless steel molding in accordance with claim 4 wherein said metal electrochemically more active than carbon steel is aluminum.

References Cited

UNITED STATES PATENTS

| | | | |
|---|---|---|---|
| 2,490,978 | 12/1949 | Osterheld | 29—196.2 X |
| 2,762,771 | 9/1956 | Preiser | 29—196.2 X |
| 3,073,720 | 1/1963 | Mets | 29—196.2 X |
| 3,190,768 | 6/1965 | Wright | 29—196.5 X |
| 3,201,210 | 8/1965 | Harkins et al. | 29—195 X |
| 3,201,211 | 8/1965 | Renshaw et al. | 29—196.5 X |
| 3,201,212 | 8/1965 | Zaremski | 29—195 X |

L. DEWAYNE RUTLEDGE, Primary Examiner

E. L. WEISE, Assistant Examiner

U.S. Cl. X.R.

29—195, 196.2